US012767069B2

(12) United States Patent
Tomosada et al.

(10) Patent No.: US 12,767,069 B2
(45) Date of Patent: Oct. 20, 2026

(54) ROUTING STRUCTURE

(71) Applicant: YAZAKI CORPORATION, Tokyo (JP)

(72) Inventors: Kosuke Tomosada, Makinohara (JP); Eri Ueda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 215 days.

(21) Appl. No.: 18/942,329

(22) Filed: Nov. 8, 2024

(65) Prior Publication Data

US 2025/0153664 A1 May 15, 2025

(30) Foreign Application Priority Data

Nov. 13, 2023 (JP) ................................ 2023-192663

(51) Int. Cl.
*B60R 16/02* (2006.01)
*H02G 11/00* (2006.01)

(52) U.S. Cl.
CPC ......... *B60R 16/0215* (2013.01); *H02G 11/00* (2013.01)

(58) Field of Classification Search
CPC .................................................. B60R 16/0215
See application file for complete search history.

(56) References Cited

U.S. PATENT DOCUMENTS

2017/0368921 A1* 12/2017 Katsuramaki ............ B60J 7/043
2020/0139907 A1* 5/2020 Sano .................... B60N 2/0715
2023/0087203 A1* 3/2023 Liu ............................ B60J 7/04 174/72 A
2023/0256922 A1* 8/2023 Kogure ............... B60R 16/0215 174/72 A
2024/0083371 A1* 3/2024 Tomosada ........... B60R 16/0215
2024/0275148 A1* 8/2024 Kogure ................ H02G 3/0437

FOREIGN PATENT DOCUMENTS

JP 2011-151906 A 8/2011

* cited by examiner

*Primary Examiner* — Hung V Ngo
(74) *Attorney, Agent, or Firm* — KENEALY VAIDYA LLP

(57) ABSTRACT

A routing structure includes: a first fixing part fixed to a vehicle body; a second fixing part fixed to a slide body that moves along a vehicle front-rear direction with respect to an opening portion provided in a roof; an exterior member having a first end portion and a second end portion; an electric wire inserted through the exterior member; and a plate-like biasing member inserted through the exterior member and forming a curved portion curved in the vehicle front-rear direction in the exterior member, in which the biasing member has a wavy portion provided in a portion where the curved portion is formed, the wavy portion includes a plurality of first crest portions and a plurality of second crest portions.

2 Claims, 12 Drawing Sheets

ROUTING STRUCTURE

CROSS-REFERENCE TO RELATED APPLICATION(S)

The present application claims priority to and incorporates by reference the entire contents of Japanese Patent Application No. 2023-192663 filed in Japan on Nov. 13, 2023.

BACKGROUND OF THE INVENTION

1. Field of the Invention

The present invention relates to a routing structure.

2. Description of the Related Art

Conventionally, there is a power feeding device for a slide body. Japanese Patent Application Laid-open No. 2011-151906 discloses a power feeding device for a slide body including a wire harness routed over a vehicle body and a slide body that is slidably provided on the vehicle body and opens and closes an opening formed in the vehicle body.

It has been studied by the inventor of the present application to arrange a biasing member having rigidity inside an exterior member when the exterior member is included in a routing structure between a vehicle body and a slide body. Here, in a case where the biasing member is curved in a narrow space between the vehicle body and the slide body, the biasing member is likely to have a tapered shape in the curved portion. The tapered shape of the curved portion causes a decrease in bending radius of an electric wire.

SUMMARY OF THE INVENTION

An object of the present invention is to provide a routing structure capable of suppressing a biasing member from having a tapered shape.

In order to achieve the above mentioned object, a routing structure according to one aspect of the present invention includes a first fixing part fixed to a vehicle body of a vehicle; a second fixing part fixed to a slide body that moves along a vehicle front-rear direction with respect to an opening portion provided in a roof of the vehicle body; an exterior member having a first end portion held by the first fixing part and a second end portion held by the second fixing part; an electric wire inserted through the exterior member; and a plate-like biasing member inserted through the exterior member and forming a curved portion curved in the vehicle front-rear direction between the first end portion and the second end portion of the exterior member, wherein the biasing member has a wavy portion provided in a portion where the curved portion is formed, the wavy portion includes a plurality of first crest portions and a plurality of second crest portions, and the first crest portions and the second crest portions are alternately arranged along an extending direction of the electric wire, when viewed from a width direction of the biasing member, the first crest portions have a convex shape toward a first side orthogonal to the extending direction, and when viewed from the width direction of the biasing member, the second crest portions have a convex shape toward a second side opposite to the first side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a routing structure according to an embodiment of the present invention will be described in detail with reference to the drawings. Note that the present invention is not limited by the present embodiment. In addition, the components in the following embodiment include those that can be easily imagined by those skilled in the art or those that are substantially the same.

Embodiment

Figure 1:
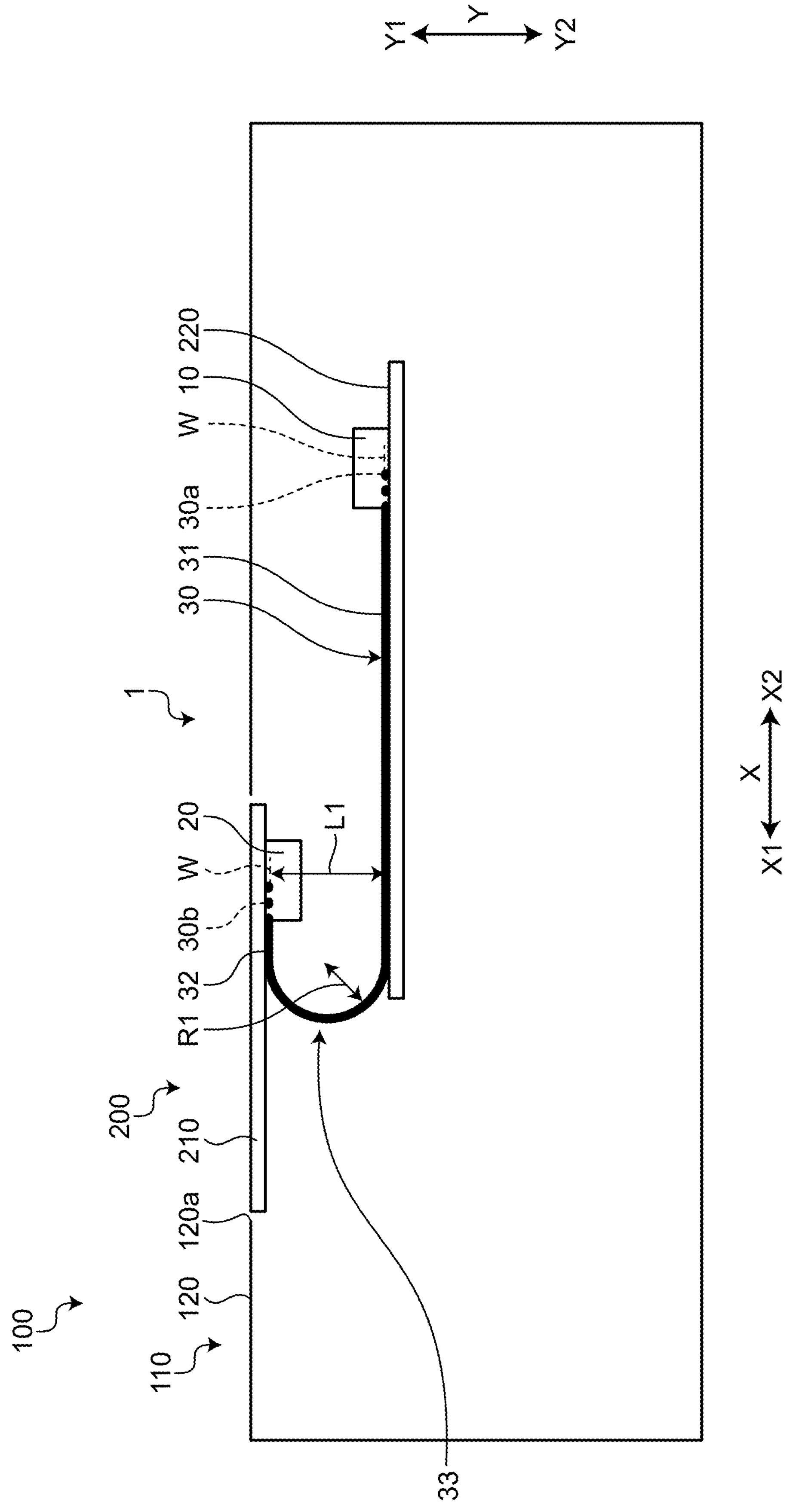
FIG. 1 is a side view of a routing structure according to an embodiment.
Figure 2:
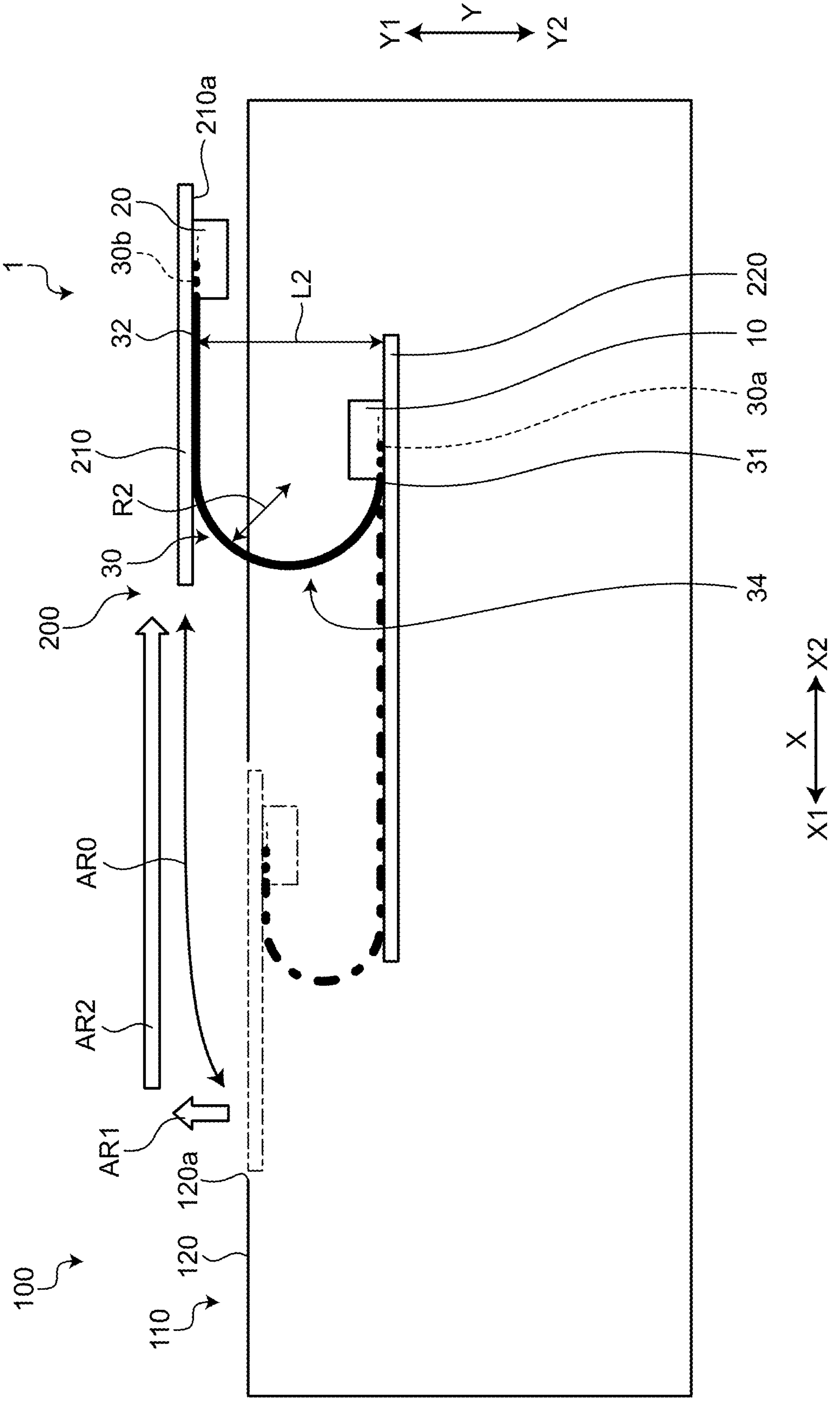
FIG. 2 is a side view of the routing structure according to the embodiment.
Figure 3:
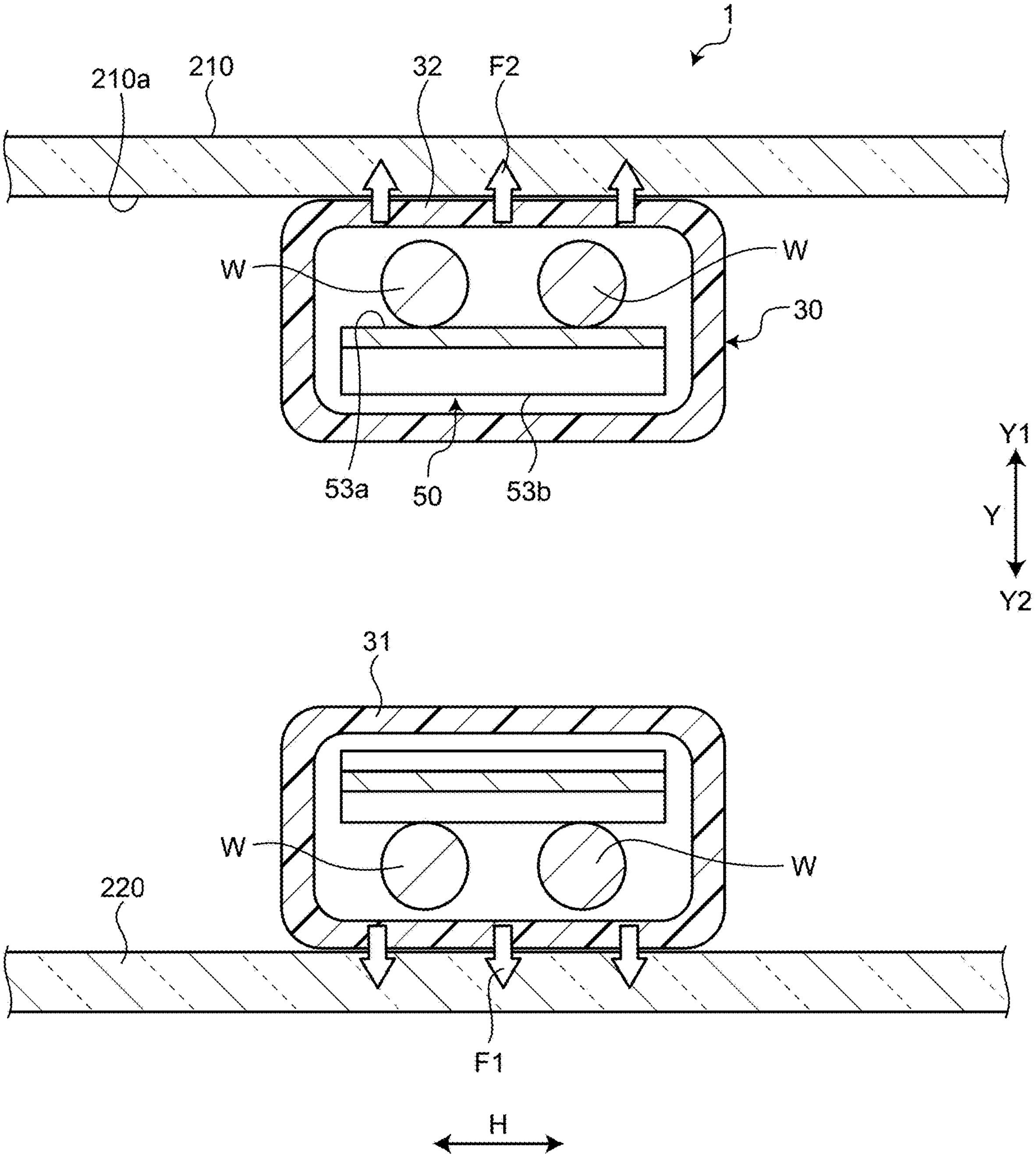
FIG. 3 is a cross-sectional view of the routing structure according to the embodiment.
Figure 4:
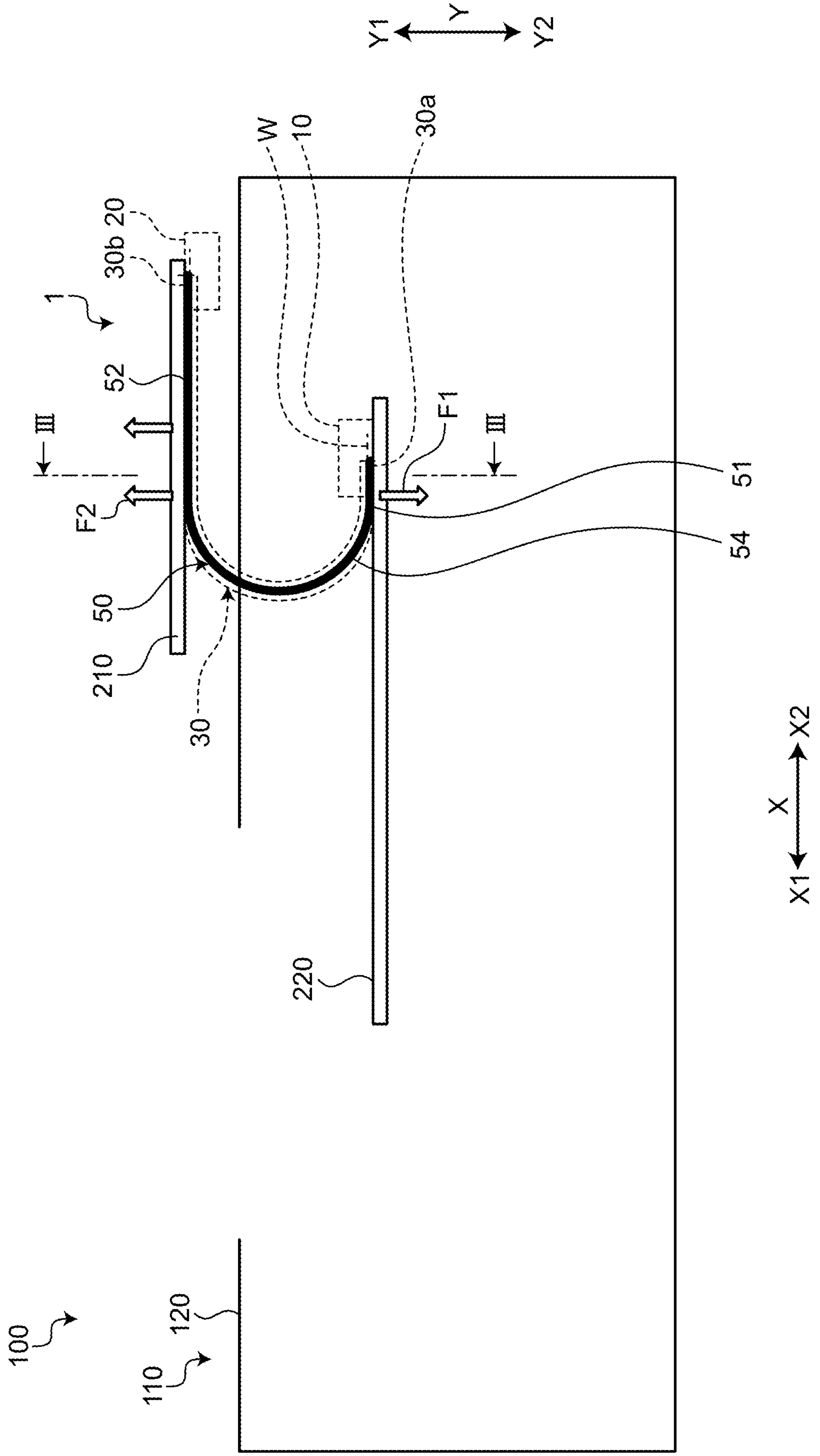
FIG. 4 is a side view of the routing structure according to the embodiment.
Figure 5:
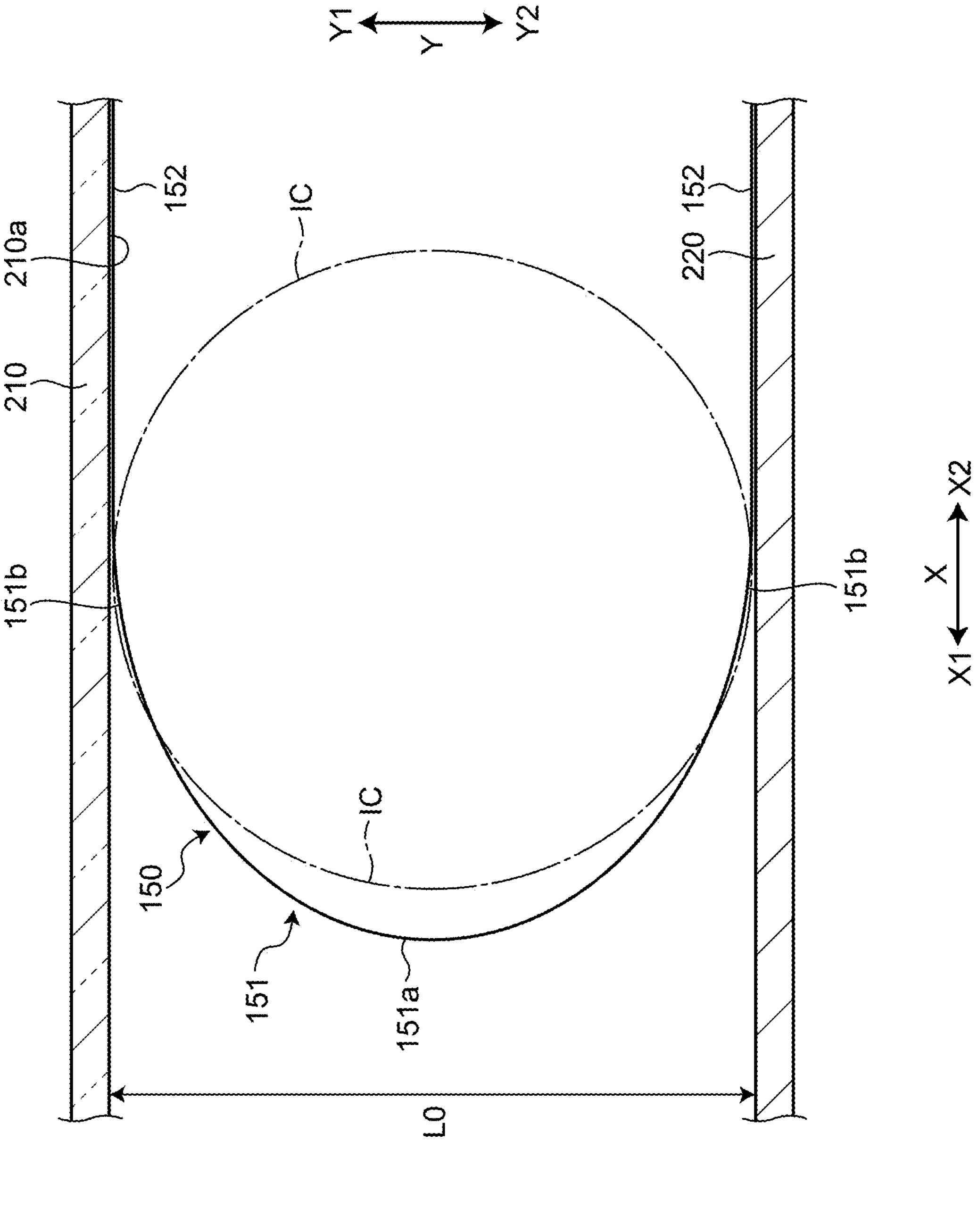
FIG. 5 is a view for explaining a tapered shape.
Figure 6:
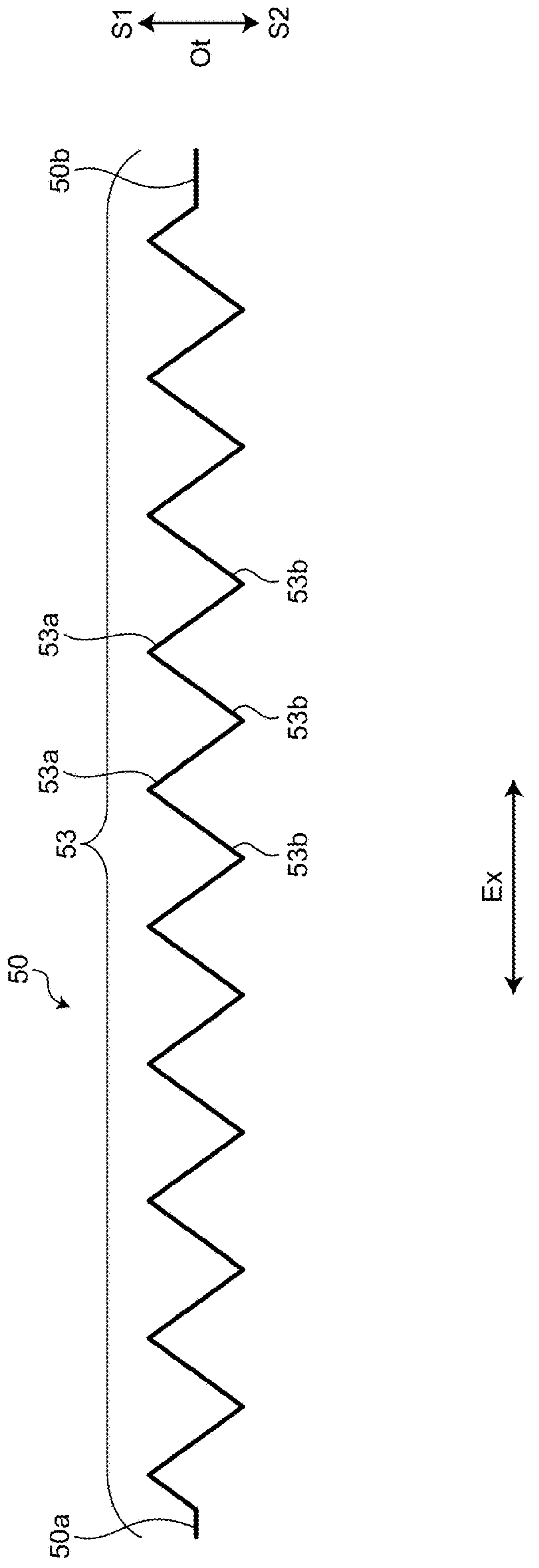
FIG. 6 is a side view of a biasing member according to the embodiment.
Figure 7:
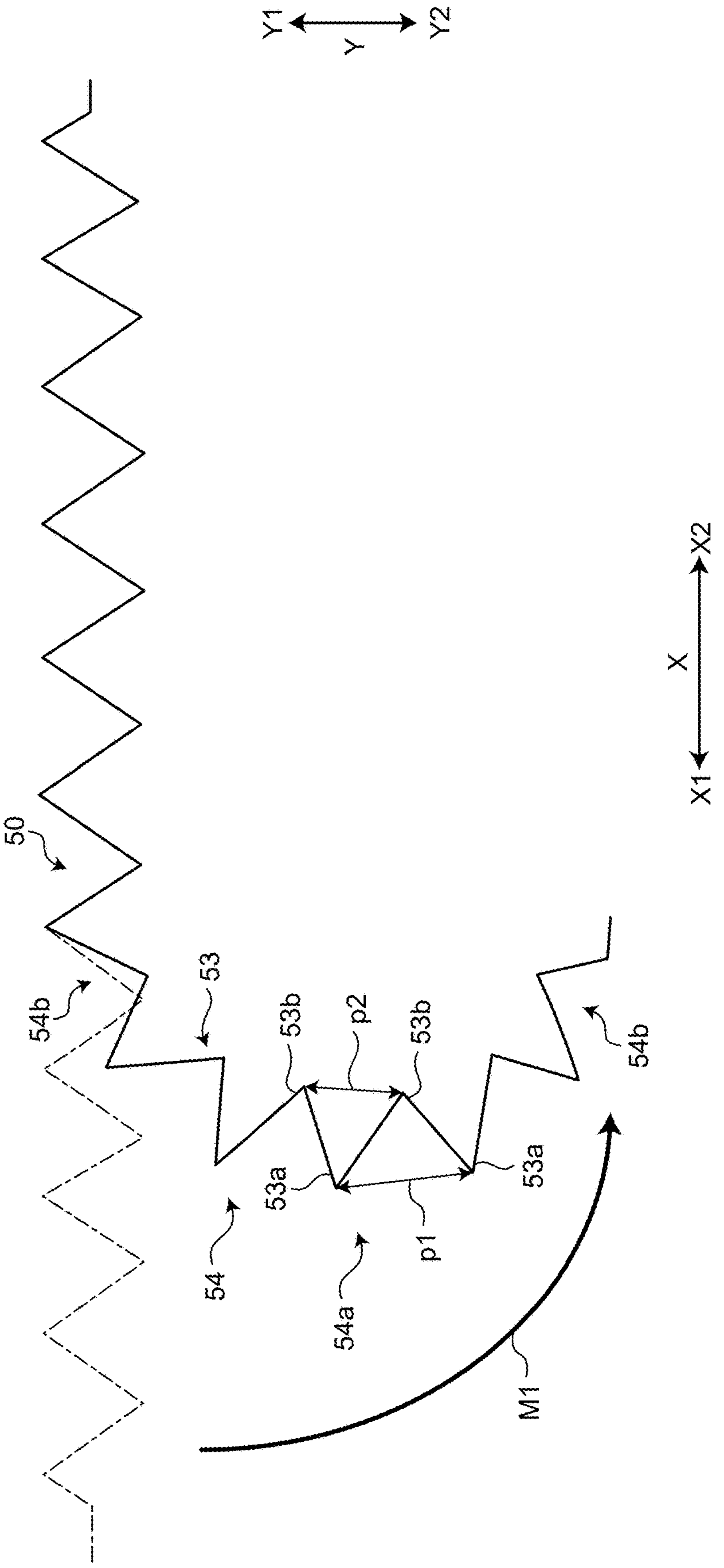
FIG. 7 is a side view of the biasing member deformed by a moment.
Figure 8:
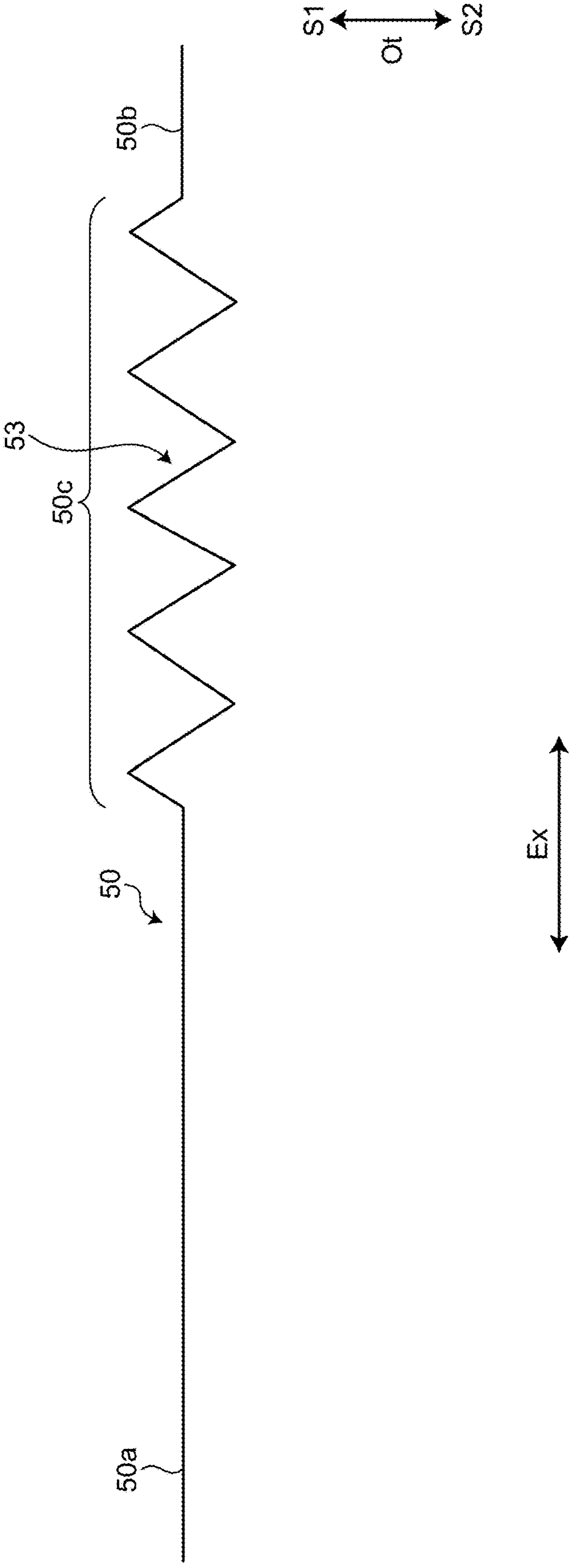
FIG. 8 is a side view of the biasing member according to the embodiment.
Figure 9:
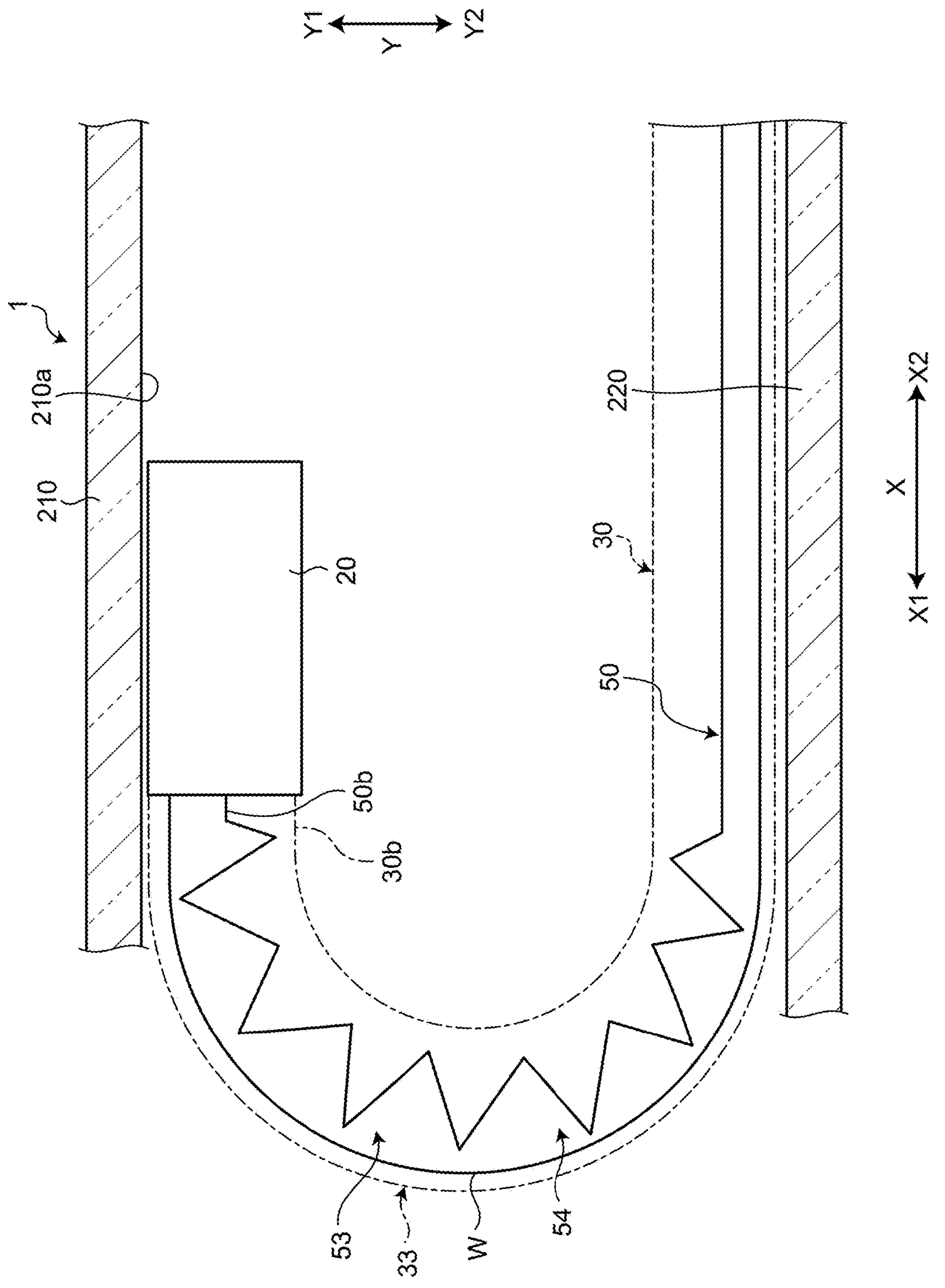
FIG. 9 is a side view of the biasing member when a slide body is at a fully closed position.
Figure 10:
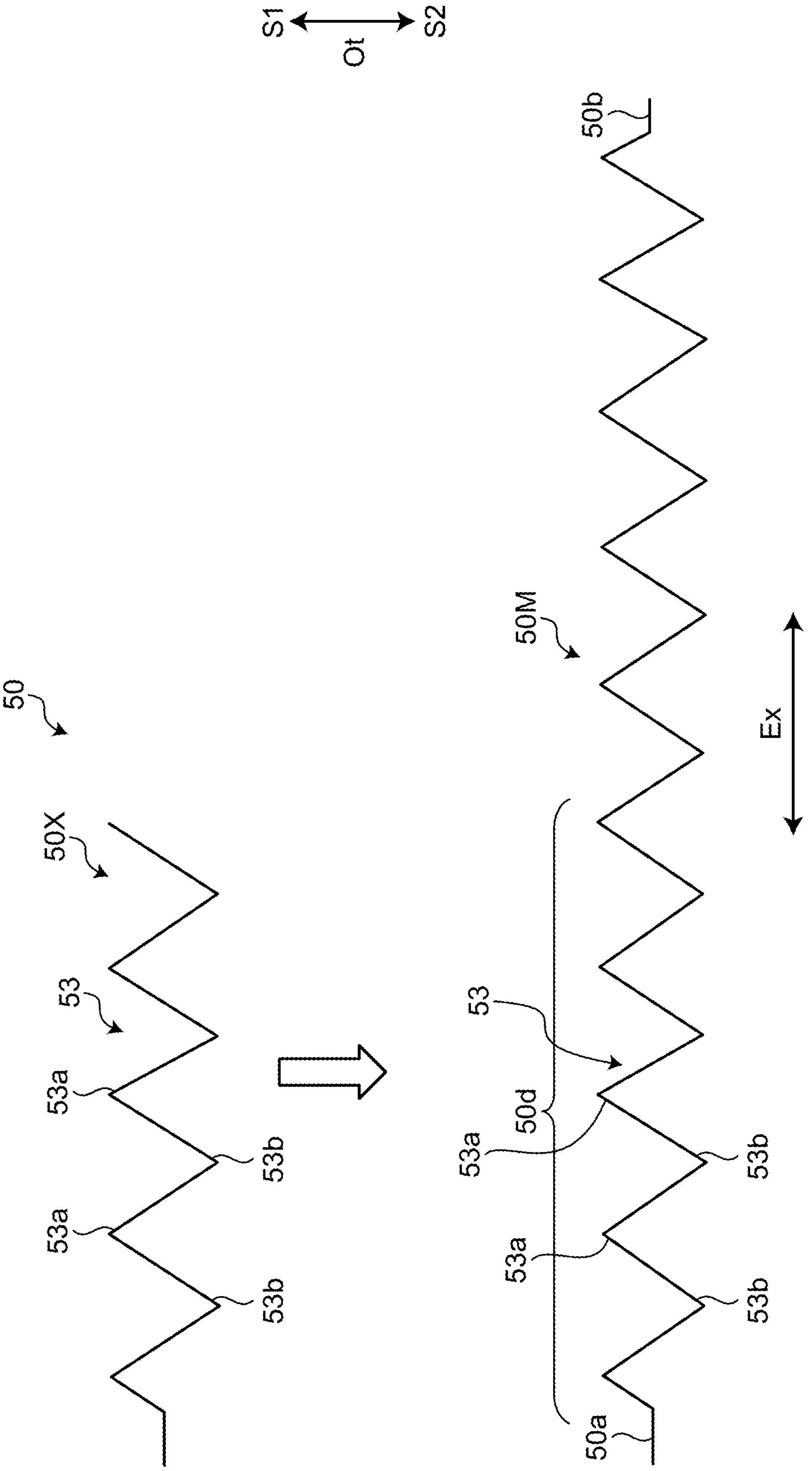
FIG. 10 is a side view of the biasing member according to the embodiment.
Figure 11:
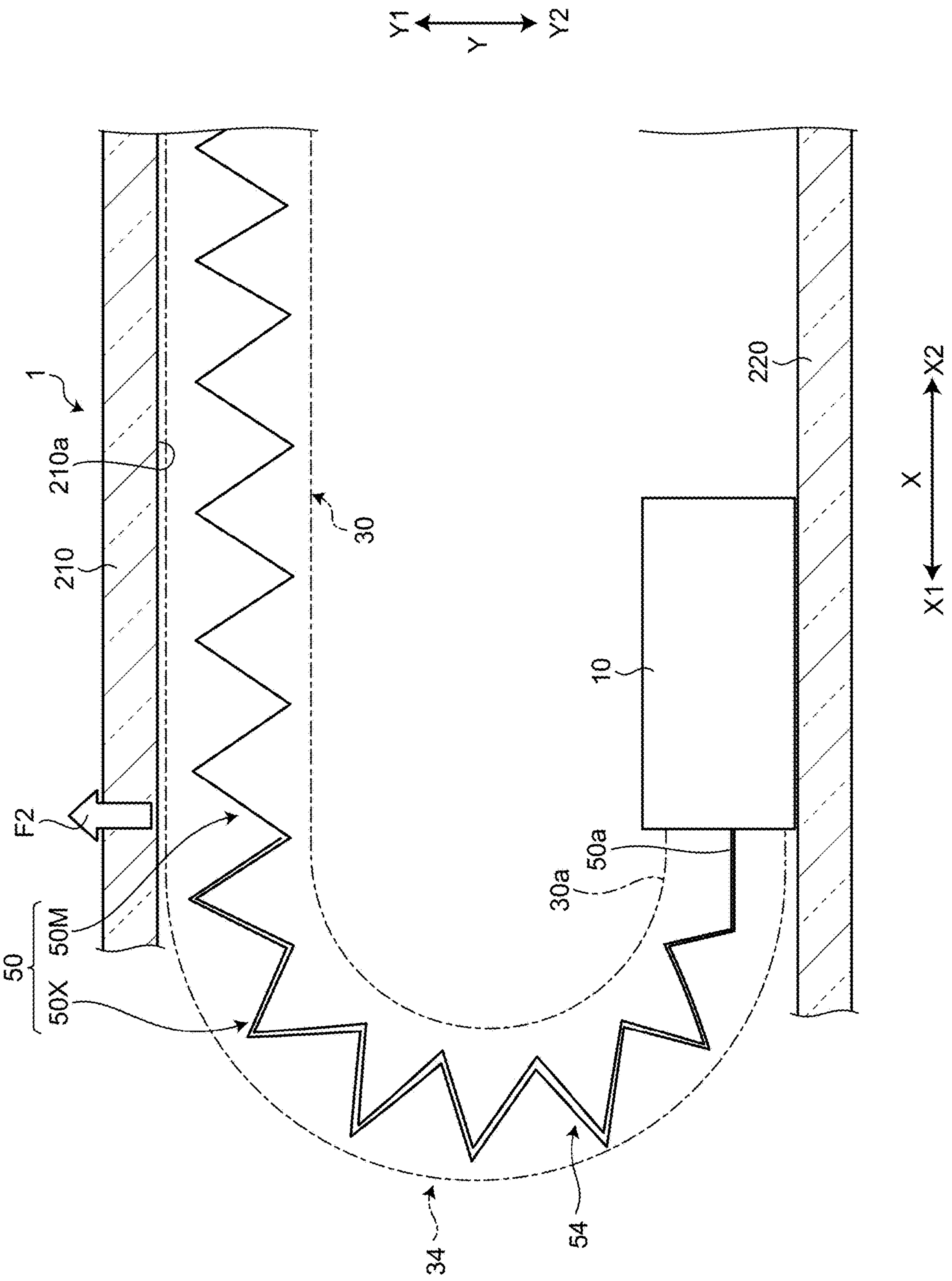
FIG. 11 is a side view of the biasing member when the slide body is at a fully opened position.
Figure 12:
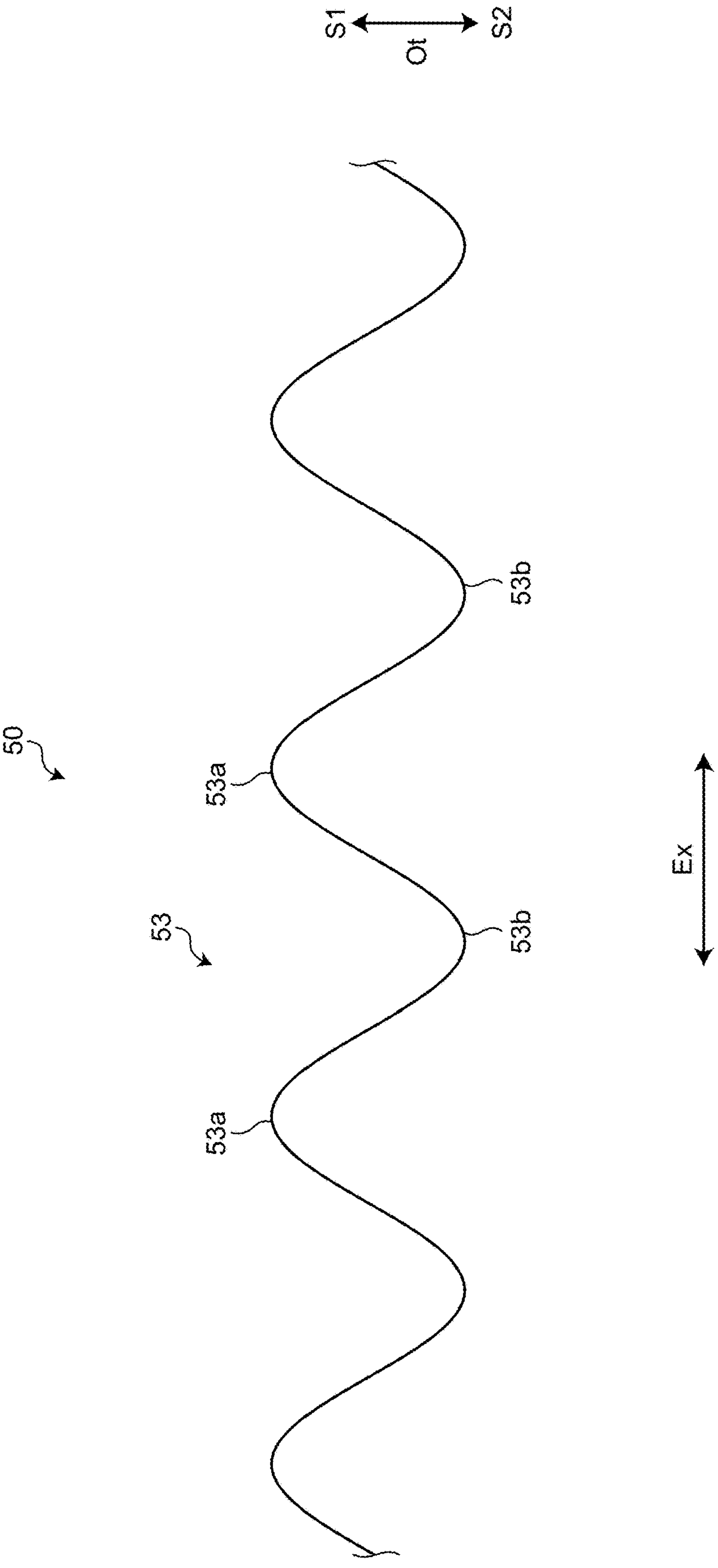
FIG. 12 is a side view illustrating an example of a shape of a wavy portion.

An embodiment will be described with reference to FIGS. 1 to 12. The present embodiment relates to a routing structure. FIGS. 1 and 2 are side views of the routing structure according to the embodiment, FIG. 3 is a cross-sectional view of the routing structure according to the embodiment, FIG. 4 is a side view of the routing structure according to the embodiment, FIG. 5 is a view for explaining a tapered shape, FIG. 6 is a side view of a biasing member according to the embodiment, FIG. 7 is a side view of the biasing member deformed by a moment, FIG. 8 is a side view of the biasing member according to an embodiment, FIG. 9 is a side view of the biasing member when a slide body is at a fully closed position, FIG. 10 is a side view of the biasing member according to the embodiment, FIG. 11 is a side view of the biasing member when the slide body is at a fully opened position, and FIG. 12 is a side view illustrating an example of a shape of a wavy portion. FIG. 3 illustrates a cross section taken along line III-III in FIG. 4.

As illustrated in FIG. 1, a routing structure 1 according to the embodiment is applied to a sunroof 200 of a vehicle 100. The vehicle 100 is, for example, an automobile on which a power source such as a motor or an engine is mounted. The vehicle 100 includes a vehicle body 110. The vehicle body 110 has a roof 120 that covers the vehicle interior. The roof 120 has an opening 120*a* that is open upward.

The vehicle 100 includes a sunroof 200 that opens and closes the opening 120*a*. The sunroof 200 has a slide body 210, a rail 220, and a routing structure 1. The slide body 210 is a member that slides along a vehicle front-rear direction X with respect to the opening 120*a*. The slide body 210 according to the present embodiment is a plate-like member that closes the opening 120*a* or opens the opening 120*a*. The slide body 210 may be glass configured to allow light to be transmitted therethrough.

The sunroof 200 includes a mechanism such as a link mechanism that moves the slide body 210 along a predetermined path, and a drive source such as a motor that operates the above mechanism. The sunroof 200 moves the slide body 210 between a fully closed position where the opening 120*a* is closed and a fully opened position where the opening 120*a* is opened. FIG. 1 illustrates the slide body 210 at the fully closed position. FIG. 2 illustrates the slide body 210 at the fully opened position.

The rail 220 is fixed to the vehicle body 110. The rail 220 is disposed on the lower side Y2 with respect to the slide body 210, and extends in the vehicle front-rear direction X. The rail 220 supports the mechanism for moving the slide body 210, and guides the mechanism in the vehicle front-rear direction X. The rail 220 further supports an exterior member 30, and forms a first extending portion 31 on the exterior member 30.

The sunroof 200 according to the present embodiment moves the slide body 210 along a path AR0 illustrated in FIG. 2. The movement of the slide body 210 along the path AR0 includes a movement along the vehicle front-rear direction X and a movement along a vehicle up-down direction Y. When the slide body 210 moves from the fully closed position toward the fully opened position, the slide body 210 moves toward an upper side Y1 in the vehicle up-down direction Y and moves toward a rear side X2 in the vehicle front-rear direction X as indicated by an arrow AR1 in FIG. 2.

Conversely, when the slide body 210 moves from the fully opened position to the fully closed position, the slide body 210 moves toward a front side X1 in the vehicle front-rear direction X and moves toward a lower side Y2 in the vehicle up-down direction Y.

As illustrated in FIGS. 1 to 3, the routing structure 1 includes a first fixing part 10, a second fixing part 20, an exterior member 30, an electric wire W, and a biasing member 50. The exterior member 30 and the electric wire W constitute a wire harness routed between the vehicle body 110 and the slide body 210.

The first fixing part 10 is a member fixed to the vehicle body 110 of the vehicle 100. The first fixing part 10 according to the present embodiment is fixed to the rail 220. The first fixing part 10 may be a protector that protects the electric wire W. The first fixing part 10 is formed of, for example, an insulating synthetic resin. The first fixing part 10 has a space in which the electric wire W is routed and has a holding structure for holding the exterior member 30.

The second fixing part 20 is a member fixed to the slide body 210 of the sunroof 200. The second fixing part 20 may be a protector that protects the electric wire W. The second fixing part 20 is formed of, for example, an insulating synthetic resin. The second fixing part 20 has a space in which the electric wire W is routed and has a holding structure for holding the exterior member 30.

The exterior member 30 is an elastically deformable tubular member. The exterior member 30 is, for example, a member called a corrugated tube. The exterior member 30 is formed of, for example, an insulating synthetic resin. The exterior member 30 may have a bellows shape.

The exterior member 30 has a first end portion 30*a* held by the first fixing part 10 and a second end portion 30*b* held by the second fixing part 20. The first fixing part 10 holds the first end portion 30*a* such that the exterior member 30 extends from the first fixing part 10 along the rail 220 in the vehicle front-rear direction X. The first fixing part 10 according to the present embodiment holds the first end portion 30*a* such that the exterior member 30 extends from the first fixing part 10 toward the front side X1.

The second fixing part 20 holds the second end portion 30*b* such that the exterior member 30 extends from the second fixing part 20 along the slide body 210 in the vehicle front-rear direction X. The second fixing part 20 according to the present embodiment holds the second end portion 30*b* such that the exterior member 30 extends from the second fixing part 20 toward the front side X1.

The electric wire W and the biasing member 50 are inserted through the exterior member 30. The electric wire W is, for example, a sheathed electric wire having a stranded wire and a sheath. The electric wire W may be a flat routing material, a printed circuit body, or another circuit body. The electric wire W drawn out from the first end portion 30*a* is connected to a power supply and a control device disposed in the vehicle body 110. The electric wire W drawn out from the second end portion 30*b* is connected to a load disposed on the slide body 210. The load disposed on the slide body 210 may be, for example, a lighting device, a light control film disposed on the glass of the slide body 210, or another electric load.

As illustrated in FIGS. 1 and 2, the exterior member 30 has a curved portion 33 or 34 that is curved in the vehicle front-rear direction X between the first end portion 30*a* and the second end portion 30*b*. The curved portion 33 or 34 is formed by the biasing member 50. The curved portion 33 illustrated in FIG. 1 is a curved portion formed in the exterior member 30 in a state where the slide body 210 is at the fully closed position. The curved portion 33 has a radius R1. The curved portion 34 illustrated in FIG. 2 is a curved portion formed in the exterior member 30 in a state where the slide body 210 is at the fully opened position. The curved portion 34 has a radius R2. The electric wire W in which the curved portion 33 or 34 is formed has a U shape or a J shape.

As illustrated in FIG. 1, when the slide body 210 is at the fully closed position, a distance of the second end portion 30*b* from the first end portion 30*a* in the vehicle up-down direction Y is a first distance L1. The radius R1 of the curved portion 33 is half the first distance L1.

As illustrated in FIG. 2, when the slide body 210 is at the fully opened position, a distance of the second end portion 30*b* from the first end portion 30*a* in the vehicle up-down direction Y is a second distance L2. The radius R2 of the curved portion 34 is half the second distance L2.

In the sunroof 200 according to the present embodiment, the second distance L2 at the fully opened position is larger than the first distance L1 at the fully closed position. Accordingly, the radius R1 of the curved portion 33 when the slide body 210 is at the fully closed position is smaller than the radius R2 of the curved portion 34 when the slide body 210 is at the fully opened position. In addition, the radius R1 when the slide body 210 is at the fully closed position is smaller than a radius of a curved shape formed in the exterior member 30 when the slide body 210 is at another position. In other words, the curved shape formed in the exterior member 30 has a smallest radius when the slide body 210 is at the fully closed position.

The second end portion 30*b* of the exterior member 30 moves together with the slide body 210. At this time, the exterior member 30 follows the movement of the second fixing part 20 while gradually changing the position where the curved shape is formed.

The biasing member 50 according to the present embodiment is a member that presses the exterior member 30 toward the slide body 210. The biasing member 50 according to the present embodiment is a plate-like member, and is elastically deformable. The biasing member 50 is formed of a metal or a resin.

As illustrated in FIG. 3, the exterior member 30 according to the present embodiment has a rectangular cross-sectional shape. The biasing member 50 extends from one end to the other end in a width direction H in the internal space of the exterior member 30. The biasing member 50 faces each of a plurality of electric wires W in the vehicle up-down direction Y. In other words, the biasing member 50 has a width capable of supporting the plurality of electric wires W.

The biasing member 50 in FIG. 3 is disposed inside the electric wire W. Therefore, in the curved portion 33 or 34, the biasing member 50 is positioned inside the electric wire W in a radial direction. As illustrated in FIG. 3, the biasing member 50 applies pressing forces F1 and F2 to the exterior member 30.

As illustrated in FIG. 4, the exterior member 30, the electric wire W, and the biasing member 50 are routed in a curved state in a U shape or a J shape. That is, the biasing member 50 extends from the first fixing part 10 to the second fixing part 20 with a curved portion 54.

The biasing member 50 bent to have the curved portion 54 forms the curved portion 33 or 34 in the exterior member 30, and applies the pressing force F1 and the pressing force F2 to the exterior member 30. The pressing force F1 is a force in the vehicle up-down direction Y, and presses the exterior member 30 toward the rail 220. The pressing force F2 is a force in the vehicle up-down direction Y, and presses the exterior member 30 toward the slide body 210. The pressing forces F1 and F2 are restoring forces generated in the bent biasing member 50.

The pressing force F1 forms a first extending portion 31 in the exterior member 30. The pressing force F2 forms a second extending portion 32 in the exterior member 30. As illustrated in FIG. 2, etc., the second extending portion 32 is a portion extending along a vehicle interior side surface 210*a* of the slide body 210. The vehicle interior side surface 210*a* is a surface facing the lower side Y2. When the vehicle interior side surface 210*a* is a flat surface, the second extending portion 32 is formed straight. When the vehicle interior side surface 210*a* has a curved shape, the second extending portion 32 has a curved shape along the vehicle interior side surface 210*a*.

The biasing member 50 according to the present embodiment is configured to press the exterior member 30 toward the slide body 210 both when the slide body 210 is at the fully closed position and when the slide body 210 is at the fully opened position. In other words, the biasing member 50 has rigidity capable of pressing the exterior member 30 against and in contact with the slide body 210 at all times. Therefore, the routing structure 1 according to the present embodiment can stabilize the shape of the exterior member 30. The biasing member 50 can keep the exterior member 30 in contact with the slide body 210 against an external force such as a vibration generated, for example, during traveling.

As will be described below, the routing structure 1 according to the present embodiment is configured to suppress the biasing member 50 from having a tapered shape. First, a tapered shape formed in a biasing member will be described.

FIG. 5 illustrates a tapered shape formed in a biasing member 150 according to a comparative example. The biasing member 150 according to the comparative example has a flat plate shape. The biasing member 150 has a curved portion 151 and straight portions 152. The straight portions 152 are portions extending straight, and are formed along the slide body 210 and the rail 220, respectively.

The curved portion 151 has a leading end portion 151*a* and two tail end portions 151*b*. The leading end portion 151*a* is a central portion of the curved portion 151, and has a convex shape in the vehicle front-rear direction X. The tail end portions 151*b* are end portions of the curved portion 151 in the vehicle up-down direction Y, and are portions connected to the straight portions 152. The curved portion 151 has a tapered shape. More specifically, the shape of the curved portion 151 is a shape in which the bending radius decreases from the tail end portion 151*b* toward the leading end portion 151*a*.

FIG. 5 illustrates a virtual circle IC. The virtual circle IC is a circle whose diameter is a distance L0 in the vehicle up-down direction Y from the rail 220 to the slide body 210. The bending radius of the leading end portion 151*a* is smaller than the radius of the virtual circle IC. In the curved portion 151 having a tapered shape, the leading end portion 151*a* has a smaller bending radius than the tail end portion 151*b*. When the distance L0 from the rail 220 to the slide body 210 is small, such a tapered shape is easily formed in the curved portion 151.

As will be described below, the biasing member 50 according to the present embodiment has a wavy portion 53. The wavy portion 53 is provided in a portion where a curved portion is formed with respect to the exterior member 30. FIG. 6 is a side view of the biasing member 50 when viewed from the width direction of the biasing member 50. The routing structure 1 is disposed, for example, such that the width direction H of the exterior member 30 and the biasing member 50 coincides with a vehicle width direction of the vehicle 100.

In the biasing member 50 of FIG. 6, the wavy portion 53 is provided in an entire range from a first end portion 50*a* to a second end portion 50*b*. The first end portion 50*a* is an end portion corresponding to the first end portion 30*a* of the exterior member 30. The second end portion 50*b* is an end portion corresponding to the second end portion 30*b* of the exterior member 30. The wavy portion 53 has a wavy shape formed at a predetermined pitch. In the biasing member 50 disposed along the electric wire W, concave and convex portions of the wavy portion 53 are repeated along the extending direction Ex of the electric wire W.

The biasing member 50 disposed along the electric wire W has an orthogonal direction Ot orthogonal to the extending direction Ex of the electric wire W. The orthogonal direction Ot is orthogonal to both the length direction and the width direction of the biasing member 50. The wavy portion 53 has a plurality of first crest portions 53*a* and a plurality of second crest portions 53*b*. In the wavy portion 53, the first crest portions 53*a* and the second crest portions 53*b* are alternately arranged. The first crest portions 53*a* have a convex shape toward a first side S1 orthogonal to the extending direction Ex. The second crest portions 53*b* have a convex shape toward a second side S2 orthogonal to the extending direction Ex.

When viewed from the width direction of the biasing member 50, the first crest portion 53*a* has a tapered shape in which its width decreases toward the tip on the first side S1. When viewed from the width direction of the biasing member 50, the second crest portion 53*b* has a tapered shape in which its width decreases toward the tip on the second side S2. The shapes of the first crest portions 53*a* and the second crest portions 53*b* illustrated in FIG. 6 are substantially triangular. That is, the illustrated wavy portion 53 has a triangular wave shape when viewed from the width direction of the biasing member 50. The first crest portions 53*a* and the second crest portions 53*b* are arranged, for example, at an equal pitch.

FIG. 7 illustrates the wavy portion 53 forming the curved portion 54. When a bending moment M1 acts on the wavy portion 53, the wavy portion 53 is deformed to form an arcuate shape. At this time, the wavy portion 53 is deformed to increase a pitch p1 between the first crest portions 53*a* and to decrease a pitch p2 between the second crest portions 53*b*. By such deformation, the wavy portion 53 can be flexibly deformed with respect to the moment M1. More specifically, in the wavy portion 53, the distribution of the reaction force with respect to the moment M1 is less likely to vary.

For example, in the biasing member 150 according to the comparative example, as one of the reasons why the tapered shape is formed in the curved portion 151, it is considered that the reaction force with respect to the moment M1 increases in the tail end portion 151*b*. In the biasing member 50 according to the present embodiment, the reaction force is suppressed in a tail end portion 54*b* of the curved portion 54, thereby suppressing the curved portion 54 from having a tapered shape. In addition, in the curved portion 54, a large difference hardly occurs between the reaction force in a leading end portion 54*a* with respect to the moment M1 and the reaction force in the tail end portion 54*b* with respect to the moment M1. Therefore, the biasing member 50 according to the present embodiment can suppress the curved portion 54 from having a tapered shape.

The pitch between the first crest portions 53*a* and the pitch between the second crest portions 53*b* in the wavy portion 53 are determined so that the curved portion 54 can be appropriately suppressed from having a tapered shape. The wavy portion 53 is formed, for example, such that the curved portion 54 has a plurality of first crest portions 53*a* and a plurality of second crest portions 53*b*.

In the biasing member 50, the range in which the wavy portion 53 is provided is not limited to the entire range from the first end portion 50*a* to the second end portion 50*b*. In the biasing member 50 illustrated in FIG. 8, the wavy portion 53 is provided in a part of the biasing member 50. More specifically, the wavy portion 53 is provided in a range 50*c* in which the curved portion 33 is formed in the fully closed state. In the biasing member 50 of FIG. 8, a portion excluding the range 50*c* in which the curved portion 33 is formed has a flat plate shape.

FIG. 9 illustrates a state in which the biasing member 50 of FIG. 8 forms the curved portion 33 in the exterior member 30. When the slide body 210 is at the fully closed position, the distance from the slide body 210 to the rail 220 in the vehicle up-down direction Y is smallest. At this time, the curved portion 54 of the biasing member 50 is suppressed from having a tapered shape, thereby suppressing a decrease in bending durability of the electric wire W.

The biasing member 50 may have a plurality of wavy portions 53. FIG. 10 illustrates the biasing member 50 having a plurality of wavy portions 53. The biasing member 50 in FIG. 10 includes a main plate-like member 50M and an additional plate-like member 50X. In the main plate-like member 50M, similarly to the biasing member 50 in FIG. 6, the wavy portion 53 is provided in the entire region. The main plate-like member 50M has a range 50*d* in which the curved portion 34 is formed in the fully opened state.

The additional plate-like member 50X has a wavy portion 53. The wavy portion 53 of the additional plate-like member 50X has a plurality of first crest portions 53*a* and a plurality of second crest portions 53*b*. The first crest portions 53*a* and the second crest portions 53*b* are alternately arranged. The additional plate-like member 50X is superposed on a part of the main plate-like member 50M. The additional plate-like member 50X is superposed on, for example, the range 50*d* in which the curved portion 34 is formed. That is, the biasing member 50 in FIG. 10 forms the curved portion 34 by the two wavy portions 53.

FIG. 11 illustrates a state in which the biasing member 50 of FIG. 10 forms the curved portion 34. The distance from the slide body 210 to the rail 220 is larger when the slide body 210 is at the fully opened position than when the slide body 210 is at the fully closed position. Since the curved portion 54 is formed by the two wavy portions 53 at this time, a sufficient pressing force F2 is secured.

The shape of the first crest portion 53*a* and the shape of the second crest portion 53*b* in the wavy portion 53 are not limited to the shapes illustrated in FIG. 6. The shape of the crest portions 53*a* and 53*b* may be a shape in which the apexes of the triangular shape in FIG. 6 are rounded. The wavy portion 53 may have, for example, curved crest portions 53*a* and 53*b* as illustrated in FIG. 12. Each of the crest portions 53*a* and 53*b* has a curved shape in which the apexes of the triangular wave are rounded. When viewed from the width direction of the biasing member 50, the shape of the wavy portion 53 may be a sinusoidal shape.

As described above, the routing structure 1 according to the present embodiment includes a first fixing part 10, a second fixing part 20, an exterior member 30, an electric wire W, and a plate-like biasing member 50. The first fixing part 10 is fixed to a vehicle body 110 of a vehicle 100. The second fixing part 20 is fixed to a slide body 210. The slide body 210 moves along a vehicle front-rear direction X with respect to an opening 120*a* provided in a roof 120 of the vehicle body 110. The exterior member 30 has a first end portion 30*a* held by the first fixing part 10 and a second end portion 30*b* held by the second fixing part 20. The electric wire W and the biasing member 50 are inserted through the exterior member 30. The biasing member 50 forms a curved portion curved in the vehicle front-rear direction X between the first end portion 30*a* and the second end portion 30*b* of the exterior member 30.

The biasing member 50 has a wavy portion 53 provided in a portion where the curved portion is formed. The wavy portion 53 has a plurality of first crest portions 53*a* and a plurality of second crest portions 53*b*. The first crest portions 53*a* and the second crest portions 53*b* are alternately arranged along an extending direction Ex of the electric wire W. When viewed from a width direction of the biasing member 50, the first crest portions 53*a* have a convex shape toward a first side S1 orthogonal to the extending direction Ex. When viewed from a width direction of the biasing member 50, the second crest portions 53*b* have a convex shape toward a second side S2 opposite to the first side S1. The routing structure 1 according to the present embodiment is capable of suppressing the biasing member 50 from having a tapered shape by forming the curved portion in the exterior member 30 through the wavy portion 53 having flexibility.

When viewed from the width direction of the biasing member 50, the first crest portion 53*a* has a tapered shape in which its width decreases toward the tip on the first side S1. When viewed from the width direction of the biasing member 50, the second crest portion 53*b* has a tapered shape in which its width decreases toward the tip on the second side S2. The wavy portion 53 having such a shape can be easily deformed to change the pitch p1 and the pitch p2.

Note that the exterior member 30 is not limited to a so-called corrugated tube. The exterior member 30 may be a braided tube or another member used as an exterior member.

The biasing member 50 may be disposed outside the electric wire W. That is, the biasing member 50 may be disposed outside the electric wire W in the radial direction in the curved portion 33 or 34.

The embodiments disclosed above can be carried out in an appropriate combination.

In the routing structure according to the present embodiment, the biasing member has a wavy portion provided in a portion where the curved portion of the exterior member is formed. The wavy portion has a plurality of first crest portions and a plurality of second crest portions, and the first crest portions and the second crest portions are alternately arranged along the extending direction of the electric wire. When viewed from the width direction of the biasing member, the first crest portions have a convex shape toward a first side orthogonal to the extending direction. When viewed from the width direction of the biasing member, the second crest portions have a convex shape toward a second side opposite to the first side. The routing structure of the present invention is advantageous in that the biasing member can be suppressed from having a tapered shape by forming a curved portion through the wavy portion having flexibility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A routing structure comprising:

a first fixing part fixed to a vehicle body of a vehicle;

a second fixing part fixed to a slide body that moves along a vehicle front-rear direction with respect to an opening portion provided in a roof of the vehicle body;

an exterior member having a first end portion held by the first fixing part and a second end portion held by the second fixing part;

an electric wire inserted through the exterior member; and a plate-like biasing member inserted through the exterior member and forming a curved portion curved in the vehicle front-rear direction between the first end portion and the second end portion of the exterior member, wherein the biasing member has a wavy portion provided in a portion where the curved portion is formed, the wavy portion includes a plurality of first crest portions and a plurality of second crest portions, and the first crest portions and the second crest portions are alternately arranged along an extending direction of the electric wire, when viewed from a width direction of the biasing member, the first crest portions have a convex shape toward a first side orthogonal to the extending direction, and when viewed from the width direction of the biasing member, the second crest portions have a convex shape toward a second side opposite to the first side.

2. The routing structure according to claim 1, wherein when viewed from the width direction of the biasing member, the first crest portions have a tapered shape in which a width thereof decreases toward a tip on the first side, and when viewed from the width direction of the biasing member, the second crest portions have a tapered shape in which a width thereof decreases toward a tip on the second side.

* * * * *